United States Patent
Lyon et al.

(10) Patent No.: US 9,052,252 B2
(45) Date of Patent: Jun. 9, 2015

(54) SENSORS, COMMUNICATION TECHNIQUES, AND RELATED SYSTEMS

(71) Applicant: COOLIT SYSTEMS INC., Calgary (CA)

(72) Inventors: Geoff Sean Lyon, Calgary (CA); Mike Holden, Cochrane (CA)

(73) Assignee: COOLIT SYSTEMS, INC., Calgary (CA)

( * ) Notice: Subject to any disclaimer, the term of this patent is extended or adjusted under 35 U.S.C. 154(b) by 0 days.

(21) Appl. No.: 14/210,165

(22) Filed: Mar. 13, 2014

(65) Prior Publication Data

US 2014/0266744 A1 Sep. 18, 2014

Related U.S. Application Data

(60) Provisional application No. 61/793,479, filed on Mar. 15, 2013.

(51) Int. Cl.
*G08B 21/00* (2006.01)
*G01M 3/18* (2006.01)

(52) U.S. Cl.
CPC ...................... *G01M 3/18* (2013.01)

(58) Field of Classification Search
CPC ........... G01M 3/00; G01M 3/02; G01M 3/18; G01P 3/00; G01P 3/04; G01P 3/28; G06F 1/20; G08B 21/00; G08B 21/20
USPC ......... 340/605, 602, 604, 606, 611, 614, 618, 340/626; 219/440, 492, 494, 497; 363/34, 363/37, 39; 180/65.1, 65.27, 65.3, 65.31

See application file for complete search history.

(56) References Cited

U.S. PATENT DOCUMENTS

| | | | | |
|---|---|---|---|---|
| 3,939,328 | A | * | 2/1976 | Davis .............................. 700/41 |
| 4,340,111 | A | * | 7/1982 | Skala .............................. 165/61 |
| 4,520,298 | A | | 5/1985 | Abbondanti |
| 4,777,578 | A | | 10/1988 | Jahns |
| 5,142,214 | A | | 8/1992 | Purson et al. |

(Continued)

FOREIGN PATENT DOCUMENTS

| WO | WO03055055 A1 | 7/2003 |
|---|---|---|
| WO | WO2005017468 A2 | 2/2005 |
| WO | WO2007029253 A2 | 3/2007 |

OTHER PUBLICATIONS

PCT Search Report and Written Opinion dated Jul. 9, 2014, in PCT International Patent Application No. PCT/IB2014/059768; 17 pages.

*Primary Examiner* — Hung T Nguyen
(74) *Attorney, Agent, or Firm* — Ganz Pollard, LLC

(57) ABSTRACT

Leak detectors can have a sensor configured to detect a presence of a working fluid externally of a liquid-based heat-transfer system. The leak detector can also have an electrical circuit configured to emit a signal responsive to a detected presence of the working fluid externally of the liquid-based heat transfer system. Methods of detecting a leak of a working fluid from a liquid-based heat-transfer system can include sensing a presence or an absence of a working fluid externally of a liquid-based heat-transfer system. The methods can include generating a tachometer signal in correspondence with a sensed absence and a sensed presence of the working fluid. The methods can include monitoring the generated tachometer signal.

28 Claims, 7 Drawing Sheets

(56) References Cited

U.S. PATENT DOCUMENTS

| | | | |
|---|---|---|---|
| 5,522,452 A | 6/1996 | Mizuno et al. | |
| 5,628,199 A * | 5/1997 | Hoglund et al. | 62/155 |
| 5,731,954 A | 3/1998 | Cheon | |
| 6,256,378 B1 | 7/2001 | Iggulden et al. | |
| 6,330,525 B1 | 12/2001 | Hays et al. | |
| 6,470,289 B1 | 10/2002 | Peters et al. | |
| 6,792,373 B2 | 9/2004 | Tabor | |
| 6,993,421 B2 * | 1/2006 | Pillar et al. | 701/29.4 |
| 7,123,996 B2 | 10/2006 | Fukushima et al. | |
| 7,221,270 B2 | 5/2007 | Chen et al. | |
| 7,274,566 B2 | 9/2007 | Campbell et al. | |
| 7,455,103 B2 | 11/2008 | Sato et al. | |
| 7,591,302 B1 | 9/2009 | Lenehan et al. | |
| 7,925,746 B1 | 4/2011 | Melton | |
| 2004/0240179 A1 | 12/2004 | Koga et al. | |
| 2006/0143439 A1 | 6/2006 | Arumugam et al. | |
| 2007/0297136 A1 | 12/2007 | Konshak | |
| 2009/0228893 A1 | 9/2009 | Behrendt et al. | |
| 2010/0065355 A1 * | 3/2010 | Reddy | 180/65.31 |
| 2010/0139887 A1 | 6/2010 | Slessman | |
| 2010/0179695 A1 | 7/2010 | Collins et al. | |
| 2010/0182809 A1 | 7/2010 | Cullinane et al. | |
| 2010/0206869 A1 | 8/2010 | Nelson et al. | |
| 2010/0211669 A1 | 8/2010 | Dalgas et al. | |
| 2010/0324962 A1 | 12/2010 | Nesler et al. | |
| 2011/0084839 A1 | 4/2011 | Groth et al. | |
| 2011/0100045 A1 | 5/2011 | Carlson | |
| 2011/0100618 A1 | 5/2011 | Carlson | |
| 2011/0115223 A1 | 5/2011 | Stahlkopf et al. | |
| 2011/0127027 A1 | 6/2011 | Kashirajima et al. | |
| 2011/0154842 A1 | 6/2011 | Heydari et al. | |
| 2011/0168379 A1 | 7/2011 | Morgan et al. | |
| 2011/0174001 A1 | 7/2011 | Carlson et al. | |
| 2011/0175498 A1 | 7/2011 | Bash et al. | |
| 2012/0273159 A1 | 11/2012 | Eriksen | |

* cited by examiner

| PIN | NAME |
|---|---|
| 1 | GND | → TO/FROM PUMP
| 2 | + 12 V DC | → TO PUMP MOTOR
| 3 | FG (SENSE) | ← TACHOMETER SIGNAL FROM PUMP
| 4 | PWM (CONTROL) | → TO PUMP CONTROLLER

FIG. 3

| PIN | NAME |
|---|---|
| 1 | GND |
| 2 | + 12 V DC |
| 3 | FG (SENSE) | ← SIMULATED TACHOMETER SIGNAL
| 4 | PWM (CONTROL) |

FIG. 5

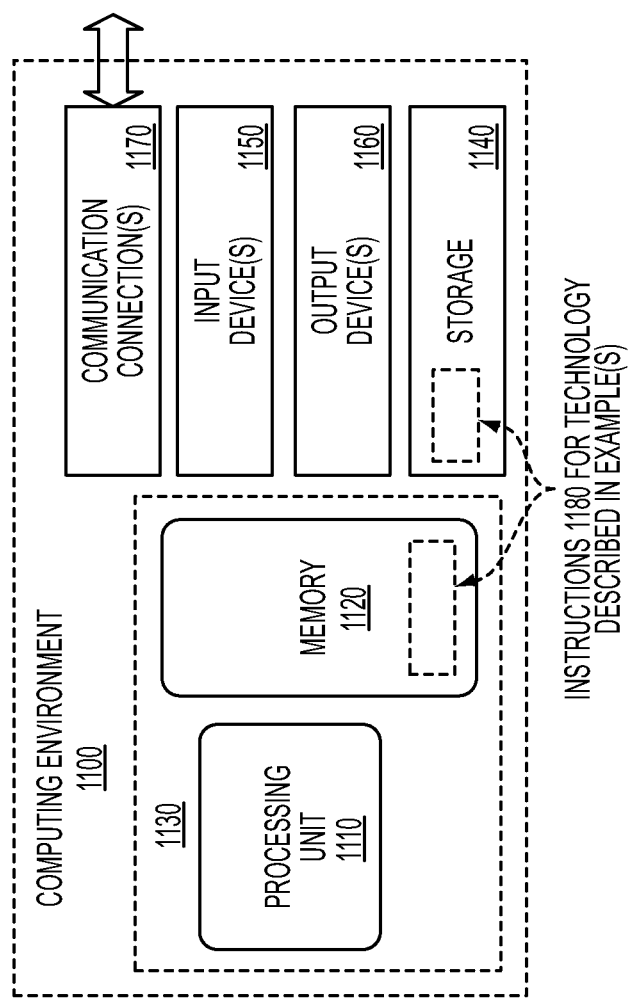

SENSORS, COMMUNICATION TECHNIQUES, AND RELATED SYSTEMS

RELATED APPLICATIONS

This application claims the benefit of and priority to U.S. patent application Ser. No. 61/793,479, filed Mar. 15, 2013, which patent application is hereby incorporated by reference as if recited in full herein for all purposes.

BACKGROUND

The innovations and related subject matter disclosed herein (collectively referred to as the "disclosure") pertain to control systems, and more particularly, but not exclusively, to detectors configured to issue an alert or a command to a controller in response to a detected change in state of a given system, with a leak detector configured to respond to a detected leak of a working fluid from a liquid-based heat transfer system being but one example of disclosed detectors and related innovations. Some detectors are described in relation to cooling systems for electronic devices by way of example, though one or more of the disclosed innovations can be suitable for use in a variety of other control-system applications, as will be understood by those of ordinary skill in the art following a review of the present disclosure.

Computer system performance and heat dissipation density continue to increase. Consequently, conventional air-cooling is giving way to liquid-cooling in some computer system applications, including, but not exclusively, server and data center applications. Although commercially available liquid cooling systems are considered to be reliable, an automated approach for detecting an unlikely leak might be desirable in some applications. However, commercially available moisture sensors and leak detectors are not compatible with existing control systems for computer systems.

Accordingly, there remains a need for sensors configured to detect a leak from a liquid cooling system. There also remains a need for a monitoring system configured to initiate an alert responsive to a leak detected by the leak detector. A need also remains for a leak detector configured to be compatible with a control system for a computer system or other computing environment.

SUMMARY

Innovations and related subject matter disclosed herein overcome many problems in the prior art and address one or more of the aforementioned, as well as other, needs. This disclosure pertains generally to control systems, including, for example, detectors configured to detect a leak of a working fluid from a heat-transfer system. Some disclosed leak detectors are configured to issue an alert or a command to a controller in response to a detected leak of a working fluid from a liquid-based heat transfer system. Some controllers are embodied in a computing environment.

As used herein, "working fluid" means a fluid used for or capable of absorbing heat from a region having a relatively higher temperature, carrying the absorbed heat (as by advection) from the region having a relatively higher temperature to a region having a relatively lower temperature, and rejecting at least a portion of the absorbed heat to the region having a relatively lower temperature. Although many formulations of working fluids are possible, common formulations include distilled water, ethylene glycol, propylene glycol, and mixtures thereof.

Some disclosed leak detectors include a sensor operatively coupled to a leak detector circuit. A leak detector circuit can be configured to deliver a signal having a selected waveform to a monitor circuit during normal operation of the cooling system, and to terminate or otherwise interrupt the signal (as by modifying the waveform, for example) when a leak of liquid is detected, as by the sensor. Some disclosed leak detectors are configured to deliver a simulated tachometer signal to a monitor circuit or computing environment. The simulated tachometer signal can be similar to a tachometer signal emitted by a fan during normal operation of the fan until a leak is detected. Upon receiving a signal or other indication of a leak, the leak detector circuit can emit a different signal (or no signal) after a leak is detected. The different signal can be emitted continuously or only while a leak (or moisture or other proxy for a leak) is detected by the sensor. For example, some disclosed leak detector circuits are configured to emit a simulated tachometer signal, e.g., a square wave having a duty cycle of about 50% (e.g., a duty cycle ranging from about 45% to about 55%), during normal operation, and to terminate or otherwise interrupt the simulated tachometer signal in response to a detected leak (or moisture or other proxy for a leak, such as a low operating pressure or a low-fluid level internal to the heat-transfer system). Such a leak detector circuit can be compatible with commercially available monitor circuits, firmware and/or software, particularly but not exclusively, monitor circuits, firmware and/or software configured to monitor a rotational speed of a fan using a tachometer signal emitted by the fan. Some monitors (e.g., circuits and/or computing environments) can be based on the Intelligent Platform Management Initiative (IPMI) specification, ver. 1.5/2.0 (described more fully below).

Other innovative aspects of this disclosure will become readily apparent to those having ordinary skill in the art from a careful review of the following detailed description (and accompanying drawings), wherein various embodiments of disclosed innovations are shown and described by way of illustration. As will be realized, other and different embodiments of leak detectors and systems incorporating one or more of the disclosed innovations are possible and several disclosed details are capable of being modified in various respects, each without departing from the spirit and scope of the principles disclosed herein. For example, the detailed description set forth below in connection with the appended drawings is intended to describe various embodiments of the disclosed innovations and is not intended to represent the only contemplated embodiments of the innovations disclosed herein. Instead, the detailed description includes specific details for the purpose of providing a comprehensive understanding of the principles disclosed herein. Accordingly the drawings and detailed description are to be regarded as illustrative in nature and not as restrictive.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of systems incorporating aspects of the presently disclosed principles are illustrated by way of example, and not by way of limitation, wherein:

FIG. 3 shows a representative pin-out for a fan header operatively coupled to a pump;

FIG. 5 shows a pinout of a fan header operatively coupled to an embodiment of a leak detector disclosed herein;

FIG. 8 shows a block diagram of a computing environment suitable for use in combination with systems, methods and apparatus described herein.

DETAILED DESCRIPTION

Figure 1:
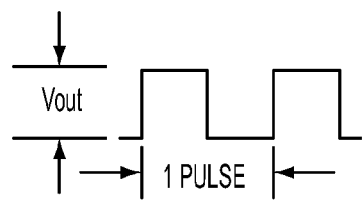
FIG. 1 shows a representative pulse of a square wave emitted by a Hall cell in response to a rotating fan rotor.

The following describes various innovative principles related to control systems by way of reference to specific examples of sensors for such systems. More particularly, but not exclusively, such innovative principles are described in relation to examples of leak detectors configured to detect a leak of a working fluid from a liquid-based heat transfer system (e.g., a liquid-based cooling system for cooling one or more electronic components that dissipate heat during operation), and related systems. Nonetheless, one or more of the disclosed principles can be incorporated in various control system embodiments to achieve any of a variety of desired control system characteristics. Systems described in relation to particular configurations, applications, or uses, are merely examples of systems incorporating one or more of the innovative principles disclosed herein and are used to illustrate one or more innovative aspects of the disclosed principles.

Thus, control systems, sensors, leak detectors and associated circuits, computing environments, firmware and/or software having attributes that are different from those specific examples discussed herein can embody one or more of the innovative principles, and can be used in applications not described herein in detail, for example, to detect a leak of a liquid from a heat-transfer system configured to transfer heat to or from laser components, light-emitting diodes, chemical reactants undergoing a chemical reaction, photovoltaic cells, solar collectors, power electronic components, electronic components other than microprocessors, photonic integrated circuits, and other electronic modules, as well as a variety of other industrial, military and consumer systems now known or hereafter developed. Accordingly, such alternative embodiments also fall within the scope of this disclosure.

Overview

A wide variety of control systems have been proposed and used. In a general sense, control systems estimate or observe an attribute of a given system under control of the control system. In response to the estimated or observed attribute, a control system can provide an output corresponding to the estimated or observed attribute in order to achieve a desired system response. Controls systems disclosed herein can be implemented in a computing environment. As indicated above and explained more fully below, some disclosed systems are configured to detect a leak of a working fluid from, for example, a liquid-based heat-transfer system. Some disclosed systems are configured to transmit an alert or other command in response to a detected leak.

As but one example, some disclosed leak detectors are configured to be backward compatible with existing control systems configured to monitor an operational status of a fan. For example, some existing control systems are configured to emit an alert or other command when an observed fan speed drops below a selected threshold. Taking advantage of an installed base of such existing control systems, some disclosed leak detectors have a circuit configured to emit a simulated tachometer signal similar to a tachometer signal emitted by a normally operating fan when no leak is detected and to emit a different signal (or no signal) in response to a detected leak. The different signal emitted in response to a detected leak can be similar to a tachometer signal emitted by a failed or failing fan (e.g., a fan operating at an unacceptably low fan speed, or a fan having a locked rotor).

Control Systems

By way of introduction, computer systems commonly include one or more axial fans for cooling an electronic component. A rate of heat transfer from an electronic component or from a liquid-to-air heat exchanger (e.g., a radiator) to a stream of air passing over the component or the heat exchanger generally corresponds, in part, to a speed of the air stream. A speed of such an air stream generally corresponds to a rotational speed of the fan.

Taking advantage of such a correspondence between a fan's rotational speed (sometimes expressed in units of "revolutions per minute" or "RPM", and sometimes referred to as a "fan speed") and a rate of cooling afforded to an electronic component or a heat exchanger, some computer systems include a control system configured to adjust a fan speed in response to an observed temperature (e.g., a temperature of an electronic component). As an example, some control systems are configured to modulate a duty cycle of, for example, a square wave, and some fans, in turn, are configured to adjust their fan speed in correspondence with the modulated duty cycle.

Figure 2:
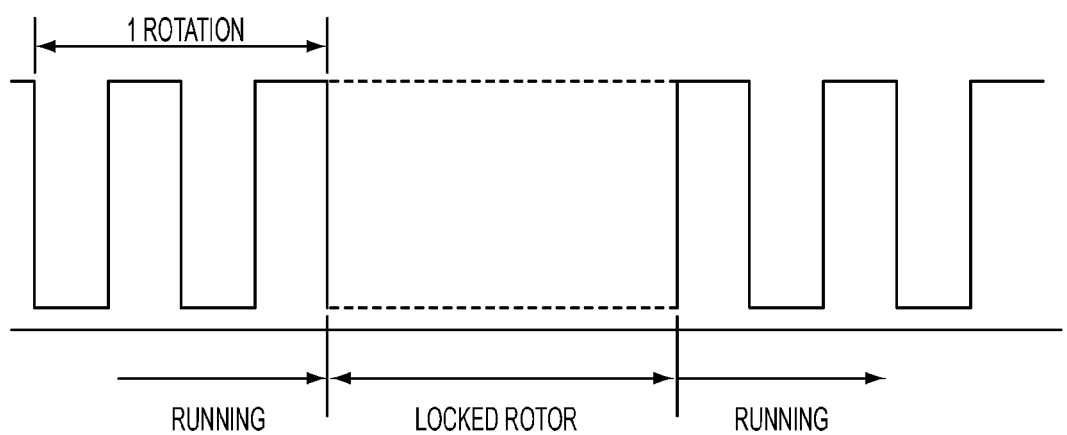
FIG. 2 shows a representative signal emitted by a fan in a running state, a locked rotor state, and another running state.

In addition (or alternatively), some computer systems include a control system configured to observe an output signal from a fan. Such an output signal can correspond to a rotational speed of the fan. For example, a fan can include a Hall cell configured to emit a square wave having a frequency corresponding to a rotational speed of a rotating magnetic field generated by a rotating fan rotor. Such an emitted square wave can have a duty cycle of about 50% when the rotor rotates at an approximately constant speed. Since the frequency of the square wave can correspond to the rotational speed of the fan, such a square wave is sometimes referred to as a "tachometer signal." FIG. 1 illustrates one pulse from a typical tachometer output having a square wave waveform. As another example, FIG. 2 shows a representative waveform of a tachometer output for a fan that changes from an operating state ("Running") having a 50% duty cycle, to a "Locked rotor" state in which no tachometer signal (or a steady-state signal) is emitted because the fan rotor does not rotate, and back to an operating state ("Running") having a 50% duty cycle.

In general, a control system can be configured to transmit an alert or other command in response to an observed signal exceeding a selected upper threshold or falling below a selected lower threshold. Some control systems are configured to resume monitoring the observed signal after transmitting the alert or other command. Other control systems (sometimes referred to in the art as a "latching system") are configured to continuously transmit an alert or other command.

Some existing control systems are configured to observe a tachometer signal emitted by a rotating fan and to emit a signal or otherwise initiate a system command (e.g., send an "alert", or initiate a system shut-down) in response to a selected change in state of a tachometer signal. A selected change of state of a tachometer signal can include a drop in frequency below a selected threshold (e.g., corresponding to an unacceptably low fan speed), a cessation of a tachometer signal or an emission of steady-state tachometer signal, as when a fan rotor stops rotating. In relation to FIG. 2, such a control system can be configured to emit a signal or otherwise initiate a system command if an observed signal indicates that a fan is in a "locked rotor" state.

Some suitable control systems configured to monitor fan speed are based on the Intelligent Platform Management Initiative (IPMI) specification, ver. 1.5/2.0. Generally, IPMI is a message-based, hardware-level interface specification. An IPMI subsystem can operate independently of an operating system of a computer incorporating the IPMI subsystem, allowing a system administrator to manage the computer independently of the operating system (e.g., before the operating system boots, or when the computer is powered down). A Baseboard Management Controller (BMC) can include a specialized microcontroller configured to manage an interface between the system management software and computer system hardware.

Among many features, an IPMI subsystem can monitor a status of various operating parameters, including, for example, system temperatures, fan speeds, chassis intrusion, etc. In some instances, an IPMI subsystem can be configured to monitor a tachometer signal emitted by one or more fans and, when the tachometer signal indicates a fan speed below a selected threshold, the subsystem can emit an alert or other command.

Computer systems incorporating such control systems for fans commonly include a plurality of electrical connectors, with each being configured to operatively couple a fan to a corresponding plurality of circuits configured, respectively, to power, control and monitor the fan. For example, such an electrical connector can have four electrical couplers corresponding respectively to (A) a power supply circuit configured to convey an electrical current for powering the fan motor; (B) an electrical ground; (C) a pulse-width modulation circuit configured to convey a pulse-width modulation signal (sometimes referred to as a "PWM signal") for controlling the fan; and (D) a sense circuit configured to convey a tachometer signal corresponding to a fan speed (sometimes referred to in the art more generally as a frequency generator signal, or an "FG" signal). Such an electrical connector is sometimes referred to in the art as a "header" or a "fan header". FIG. 3 shows a typical pinout for a header with annotations reflecting use of the header in conjunction with a pump.

Leak Detectors

A leak detector circuit can be configured to respond to a leak (e.g., moisture or another selected proxy for a leak) of a working fluid detected by a sensor. For example, an innovative leak detector circuit can be configured to emit a first waveform in the absence of a detected leak and to emit a second waveform responsive to a detected leak. Any suitable sensor configured to detect a leak (or other proxy for a leak, e.g., moisture, presence of a working fluid at a position external to a heat-transfer system, a low pressure in the heat-transfer system, a low fluid level in the heat-transfer system) can be used in connection with such an electrical circuit.

Figure 4:
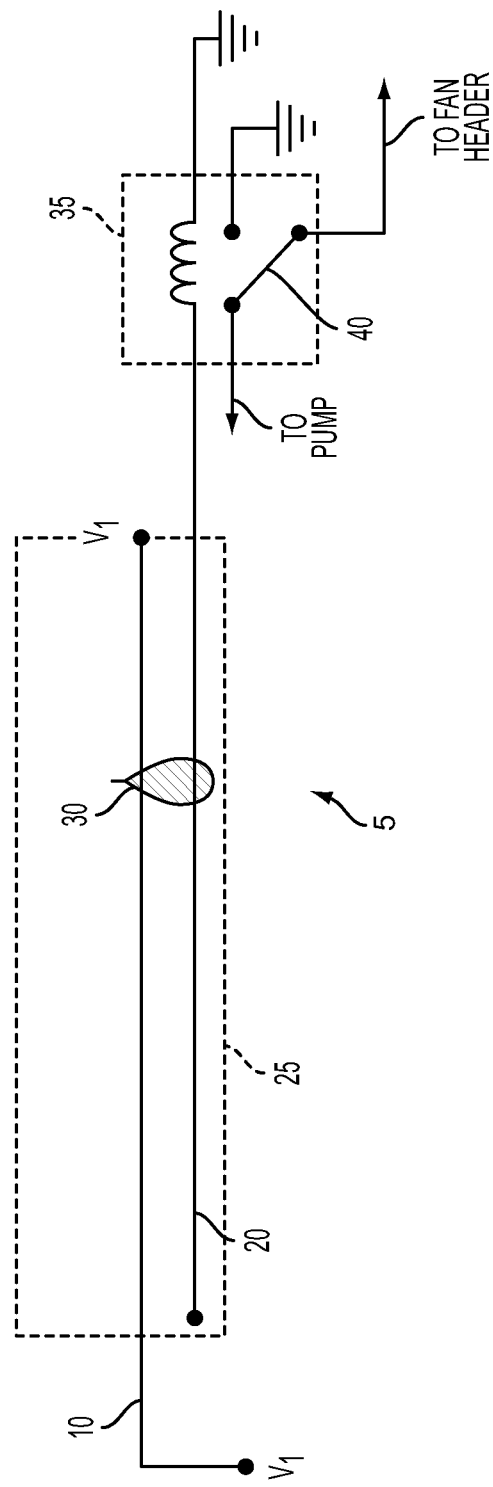
FIG. 4 shows a portion of but one of many leak detector embodiments disclosed herein.

As but one of many possible examples of leak-detection sensors, a leak-detection sensor can have a first leak-detection wire 10 and a second leak-detection wire 20, as shown in FIG. 4. The first and the second leak-detection wires 10, 20 can comprise respective exposed traces on a printed circuit board. As shown in FIG. 4, the first leak-detection wire 10 can extend from a power plane, $V_1$. The second leak-detection wire 20 can extend generally parallel to and spaced apart from the first leak-detection wire 10. A region in which the first and the second wires 10, 20 are coextensive can define a leak-sensitive region of the sensor.

A leak can be detected when a circuit between the first and the second leak-detection wires 10, 20 is closed. For example, a drop 30 of a leaked liquid can span a gap between the first and the second leak-detection wires 10, 20 within the leak-sensitive region of the sensor, electrically coupling the first and the second leak-detection wires to each other.

When the circuit between such first and second leak-detection wires 10, 20 is closed, the circuit of the leak detector can emit a corresponding signal indicative of a detected leak. For example, when the first and the second leak-detection wires 10, 20 shown in FIG. 4 are electrically coupled to each other, the second leak-detection wire 20 can be pulled high (e.g., can have a voltage potential corresponding to the voltage of the power plane, $V_1$), and can activate a relay. When the illustrated relay is activated, the latch 40 electrically coupling the pump and the fan header to each other can be switched to open (e.g., disconnect) the coupling between the pump and the fan header. Such a disconnection of at least one coupling between the pump and the header can serve as a signal to a monitoring system that a leak has been detected. The monitoring system can in response initiate an alert or a system command.

Many other leak-detection sensor and leak detector circuit configurations are possible. As but several examples, such sensors can include a capacitive moisture sensor, an optical sensor, an infrared sensor, a pressure sensor configured to observe a pressure within the heat-transfer system, a sensor configured to detect a low fluid level in the heat-transfer system, and other sensors now known and hereafter developed.

Some leak detectors can have an electrical circuit operatively coupled to an FG signal pin of a header and be configured, in the absence of a detected leak, to emit a simulated tachometer signal having a waveform similar to a waveform emitted by a properly operating fan. FIG. 5 shows a header operatively coupled to such an electrical circuit. The electrical circuit (not shown) can be further configured to emit a simulated tachometer signal having a waveform similar to a failed or failing fan in response to a detected leak of a liquid from a liquid-base heat-transfer system (e.g., when a circuit between first and second leak-detection wires is closed). Alternatively, the electrical circuit can be configured to emit no tachometer signal, similar to a fan having a locked rotor (see FIG. 2) in response to a detected leak of a liquid from a liquid-base heat-transfer system.

As an example, a leak detector circuit can be operatively coupled to an available fan header. In response to a detected leak, the simulated signal can be interpreted as by switching the relay as described above in relation to FIG. 4.

Alternatively, a leak-detection sensor can be operatively coupled to an electrical circuit associated with one or more pumps of the liquid-based heat-transfer system. For example, such a pump can be electrically coupled to a header having a power pin, a ground pin, a PWM pin and an FG pin. The power pin can be operatively coupled to the pump motor to convey an electrical current to the pump to operate the pump. The PWM pin be operatively coupled to a pump controller and convey a pump-control signal to the pump controller, e.g., to control a speed of the pump. The FG pin can convey monitor a tachometer signal emitted by the pump to a sensing circuit configured to monitor the pump (or fan) speed.

In one example, a leak detector circuit can be operatively coupled between the power pin of the header and the pump motor. In such an embodiment, the leak detector circuit can interrupt a supply of electrical current to the pump (or increase a supply of electrical current to the pump) in response to a detected leak, causing a corresponding reduction (or increase) in pump speed. A corresponding FG signal emitted by the pump can reflect the diminished (or increased) pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both. Some implementers might elect not to interrupt power to a pump if stopping a pump might be considered a catastrophic failure.

In an alternative embodiment, a leak detector circuit can be operatively coupled between the PWM pin of the fan header and the pump. In such an embodiment, the leak detector circuit can interrupt a PWM signal conveyed to the pump by the PWM pin of the fan header and convey an alternative PWM signal (or no PWM signal) to the pump in response to a detected leak. The alternative PWM signal can cause the pump to speed up, to slow down, or to stop. An FG signal emitted by the pump can reflect the change in pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

In still another alternative embodiment, a leak detector circuit can be operatively coupled between the FG pin of the fan header and the pump. In such an embodiment, the leak detector circuit can interrupt an FG signal emitted by the pump and convey an alternative FG signal (or no FG signal) to the FG signal pin in response to a detected leak. The alternative FG signal can simulate a diminished pump speed, a selected increased pump speed, or no pump speed. A system configured to monitor the simulated FG signal can, in response to a selected change in the simulated FG signal corresponding to a change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

A leak sensor can be positioned adjacent to (e.g., routed around) a pump or other component of a liquid-based heat-transfer system. For example, a sensor can be positioned on, embedded in, affixed to, positioned adjacent to, or otherwise operatively coupled to a printed circuit board such that the sensor defines a sensor region. The sensor region can be selected to correspond to a region that might be susceptible to wetting by a working fluid in the event of a leak.

Figure 6:
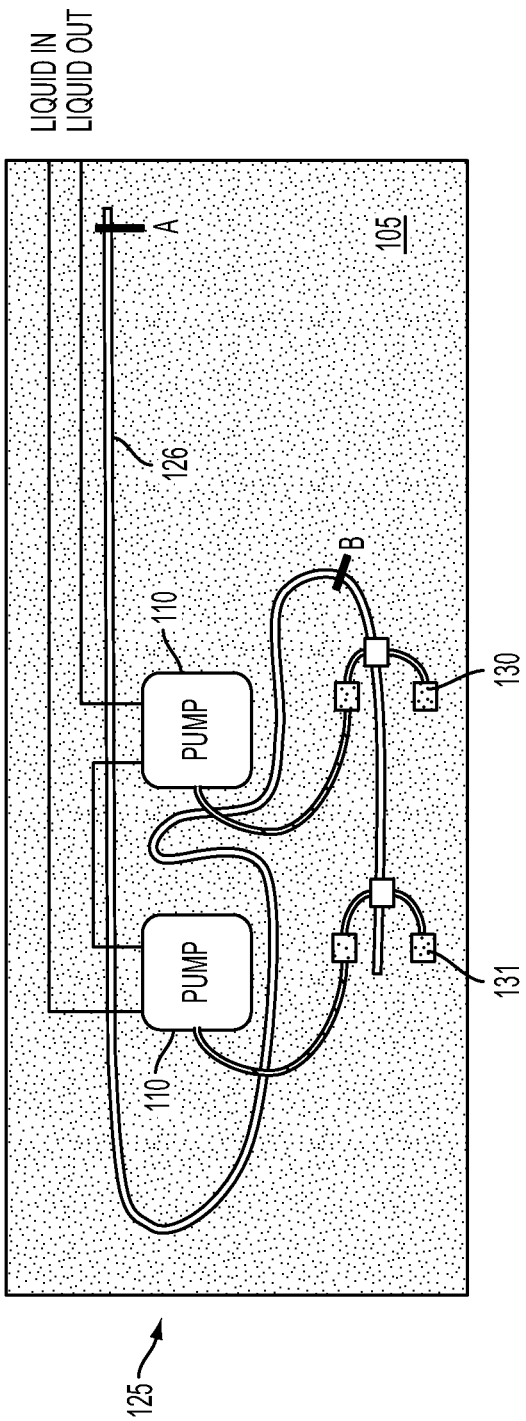
FIG. 6 shows a schematic illustration of a system including a leak detector disclosed herein.
Figure 7:
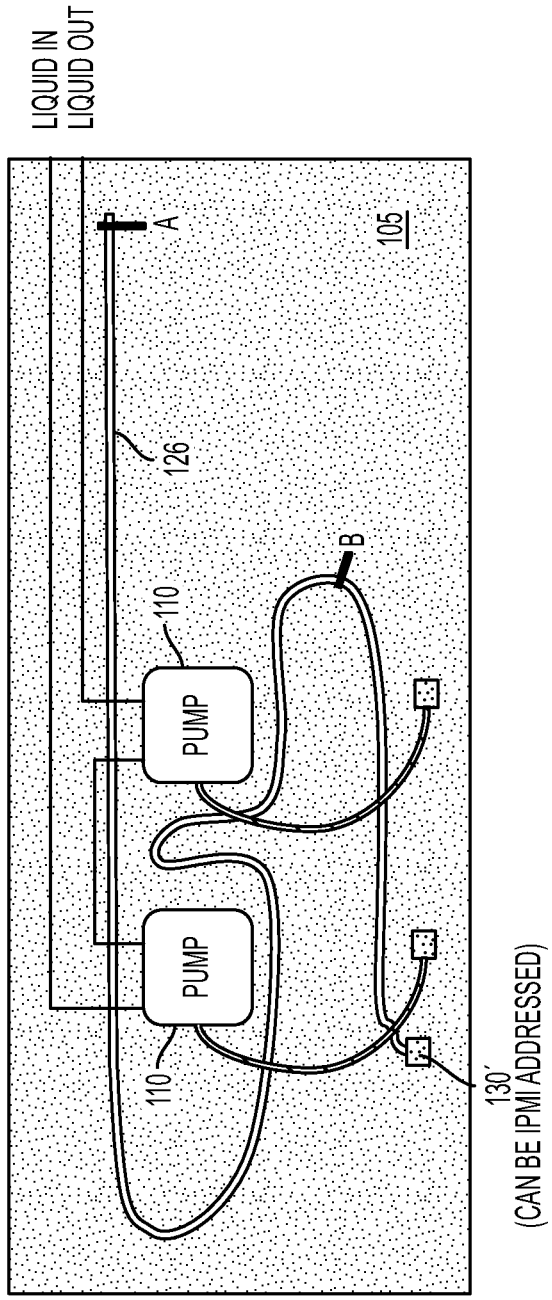
FIG. 7 shows a schematic illustration of an alternative system including a leak detector disclosed herein.

FIGS. 6 and 7 show examples of a sensitive region defined by a leak sensor. The illustrated sensitive region extends along the leak sensor (e.g., between points "A" and "B") routed on a surface of a printed circuit board. In FIG. 6, the leak detector is configured to interrupt a tachometer signal emitted by each pump in response to a detected leak. In FIG. 7, the leak detector circuit is configured to interrupt a simulated tachometer signal in response to a detected leak. Such interruptions can simulate a tachometer signal emitted by a fan having a "locked rotor." A corresponding control system configured to monitor a tachometer signal emitted from a fan can respond to a simulated "locked rotor" signal by initiating an alert or other system command.

Computing Environments

FIG. 8 illustrates a generalized example of a suitable computing environment 1100 in which described methods, embodiments, techniques, and technologies relating, for example, to control systems, may be implemented. The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, mini-computers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 1100 includes at least one central processing unit 1110 and memory 1120. In FIG. 8, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal. The data signal can include information pertaining to a physical parameter observed by a sensor or pertaining to a command issued by a controller, e.g., to invoke a change in an operation of a component in the system 10 (FIG. 1).

Computer-readable media are any available media that can be accessed within a computing environment 1100. By way of example, and not limitation, with the computing environment 1100, computer-readable media include memory 1120, storage 1140, communication media (not shown), and combinations of any of the above.

Other Exemplary Embodiments

The examples described herein generally concern control systems configured to respond to a detected condition of a liquid-based heat-transfer system, e.g., to issue an alert or other command responsive to a detected leak of a working fluid. Other embodiments of leak detectors and control systems than those described above in detail are contemplated based on the principles disclosed herein, together with any attendant changes in configurations of the respective apparatus and/or circuits described herein. Incorporating the principles disclosed herein, it is possible to provide a wide variety of control systems configured to issue an alert or other command. For example, disclosed detectors can be used to detect a leak of a working fluid from a heat-transfer system for a data center, a laser component, a light-emitting diode, a chemical reactor, photovoltaic cells, solar collectors, and a variety of other industrial, military and consumer devices now known and hereafter developed. Moreover, systems disclosed above can be used in combination with other liquid-based systems including, inter alia, reactor vessels.

Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. We therefore reserve all rights to the subject matter disclosed herein, including the right to claim all that comes within the scope and spirit of the following claims.

The invention claimed is:

1. A control system, comprising:
   a sensor circuit configured to emit a simulated tachometer signal corresponding to a rotational speed as a proxy for an observed indicia of a presence or an absence of a leak;
   a controller configured to receive the simulated tachometer signal and to infer from the simulated tachometer signal a presence or absence of a leak.

2. The control system according to claim 1, wherein the controller is further configured to emit a command signal responsive to a detected presence of a leak, a detected absence of a leak, or both.

3. The control system according to claim 1, wherein the simulated tachometer signal comprises a simulated reproduction of a waveform emitted by a properly or an improperly operating, or a failed, fan.

4. The control system according to claim 1, wherein the observed indicia consists of one or more of an indicia of fluid level, an indicia of pressure, an indicia of electrical current, and an indicia of a presence or absence of moisture.

5. The control system according to claim 1, wherein the observed indicia comprises an indicia of a presence or absence of a working fluid externally of a liquid-based heat-transfer system, wherein the sensor circuit comprises an electrical circuit configured to emit the simulated tachometer signal responsive to the indicia of a presence of the working fluid externally of the liquid-based heat transfer system.

6. The control system according to claim 5, wherein the electrical circuit is further configured to emit a different simulated tachometer signal responsive to the indicia indicating an absence of the working fluid externally of the liquid-based heat transfer system.

7. The control system according to claim 6, wherein the signal responsive to the indicia indicating a presence of the working fluid externally of the liquid-based heat-transfer system comprises an interruption to the simulated tachometer signal emitted responsively to the indicia indicating an absence of the working fluid externally of the liquid-based heat-transfer system.

8. The control system according to claim 1, wherein the sensor circuit comprises a sensitive region operatively coupled to a printed circuit board and positioned adjacent a component susceptible to wetting by a working fluid if a leak of the working fluid occurs.

9. The control system according to claim 1, wherein the controller is configured to interrupt at least one electrical coupling between a pump and a fan header responsive to a predefined state of the observed indicia.

10. The control system according to claim 9, wherein the simulated tachometer signal comprises an interruption to at least one electrical coupling between the pump and the fan header.

11. The control system according to claim 10, wherein the at least one electrical coupling between a pump and a fan header comprises a first electrical coupling between a first pump and a first fan header and a second electrical coupling between a second pump and a second fan header.

12. The control system according to claim 10, wherein the electrical coupling comprises an electrical current for powering the pump, a pulse-width-modulation signal for controlling the pump, frequency-generator signal for monitoring operation of the pump.

13. The control system according to claim 9, wherein the electrical coupling comprises an electrical current for powering the pump, a pulse-width-modulation signal for controlling the pump, frequency-generator signal for monitoring operation of the pump.

14. The control system according to claim 9, further comprising the fan header and the pump, wherein the pump is electrically coupled to the header.

15. A method of detecting a leak of a working fluid from a liquid-based heat-transfer system, the method comprising:
sensing a presence or an absence of a working fluid externally of a liquid-based heat-transfer system;
generating a tachometer signal in correspondence with the sensed absence or the sensed presence of the working fluid; and
inferring from—the generated tachometer signal a presence or an absence of the working fluid.

16. The method according to claim 15, further comprising emitting a signal responsive to the act of inferring a presence of the working fluid.

17. The method according to claim 16, wherein the signal emitted responsively to an inferred presence of working fluid comprises an alert to a system administrator.

18. The method according to claim 16, wherein the signal emitted responsively to an inferred presence of working fluid comprises a command to a control system.

19. The method according to claim 15, wherein the generated tachometer signal in the sensed absence of the working fluid corresponds to an actual rotational speed of a pump.

20. The method according to 15, wherein the generated tachometer signal in the sensed absence of the working fluid comprises a simulated tachometer signal of the type emitted by an operable fan.

21. The method according to claim 15, wherein the generated tachometer signal in the sensed presence of the working fluid comprises a simulated tachometer signal of the type emitted by an inoperable fan.

22. A control system comprising:
a sensor configured to detect an indicia of a presence of a liquid, an absence of a liquid, or both;
an electrical circuit operatively coupled to the sensor and configured to emit a tachometer signal indicative of a first rotational speed absent an indicated presence of the liquid and indicative of a second rotational speed responsive to an indicated presence of the liquid.

23. The control system according to claim 22, wherein the tachometer signal emitted responsive to a detected presence of the liquid comprises an interruption to the tachometer signal indicative of the first rotational speed.

24. The control system according to claim 22, further comprising a controller configured to monitor the tachometer signal and to emit an alert in response to the tachometer signal being indicative of the second rotational speed.

25. The control system according to claim 22, wherein the first rotational speed constitutes an actual rotational speed of a pump.

26. The control system according to claim 25, wherein the second rotational speed constitutes a simulated rotational speed of the pump.

27. The control system according to claim 26, wherein the simulated rotational speed of the pump comprises a diminished pump speed relative to the actual rotational speed of the pump.

28. The control system according to claim 25, wherein the tachometer signal indicative of the second rotational speed comprises a tachometer signal indicative of a diminished pump speed relative to the actual rotational speed of the pump, an increased pump speed relative to the actual rotational speed of the pump, or no pump speed.

* * * * *